United States Patent
Buytaert et al.

(10) Patent No.: US 8,763,690 B2
(45) Date of Patent: Jul. 1, 2014

(54) CASING CENTRALIZERS HAVING FLEXIBLE BOW SPRINGS

(75) Inventors: Jean Buytaert, Mineral Wells, TX (US); Eugene Edward Miller, Weatherford, TX (US); Ira Eugene Hining, Weatherford, TX (US)

(73) Assignee: Antelope Oil Tool & Mfg. Co., LLC, Mineral Wells, TX (US)

( * ) Notice: Subject to any disclaimer, the term of this patent is extended or adjusted under 35 U.S.C. 154(b) by 1120 days.

(21) Appl. No.: 12/756,173

(22) Filed: Apr. 7, 2010

(65) Prior Publication Data

US 2010/0218956 A1 Sep. 2, 2010

Related U.S. Application Data

(63) Continuation-in-part of application No. 11/749,544, filed on May 16, 2007, now Pat. No. 7,845,061.

(60) Provisional application No. 61/287,665, filed on Dec. 17, 2009, provisional application No. 61/237,202, filed on Aug. 26, 2009, provisional application No. 61/221,716, filed on Jun. 30, 2009, provisional application No. 61/167,482, filed on Apr. 7, 2009.

(51) Int. Cl.
*E21B 17/10* (2006.01)

(52) U.S. Cl.
USPC ..................... 166/241.6; 175/325.5

(58) Field of Classification Search
USPC ........... 29/896.9, 446, 557, 506, 525, 525.01; 166/241.1–241.7, 242.1; 175/325.5, 175/325.6; 285/345, 417
See application file for complete search history.

(56) References Cited

U.S. PATENT DOCUMENTS

| 1,201,706 A | 10/1916 | Dodge |
| 2,368,401 A | 1/1945 | Baker |

(Continued)

FOREIGN PATENT DOCUMENTS

WO  WO9964714  12/1999

OTHER PUBLICATIONS

Frank's Anaconda Stop Collar Sheet, Frank's Casing Crew & Rental Tools, Inc., Lafayette, LA, 2003.

(Continued)

*Primary Examiner* — Sarang Afzali
(74) *Attorney, Agent, or Firm* — MH2 Technology Law Group, LLP

(57) ABSTRACT

A bow-spring centralizer (6) includes bow springs (5), moving collars (11) secured to each end of each bow spring, and interlocked stop collars (10). Extendable collars (8) may each be formed of a moving collar (11) movably interlocked with a stop collar (10). The centralizer (6) may optionally be formed from a tube cut using a laser to create two extendable collars coupled by bow springs. Each extendable collar may include heads integrally formed on extensions protruding from a collar (stop collar or moving collar). The heads may be generally rectangular, arrow, or teardrop-shaped head or some other shape. Each head may be slidably captured within a chamber on the interlocked collar (moving collar or stop collar). The extensions of each interlocked tubular member define the outer walls of the chamber in which a head of the interlocked tubular member is slidably captured. The stop collars may include or cooperate with one or more fingers extending along a casing to be secured by a sleeve that forms an interference fit about the casing.

19 Claims, 6 Drawing Sheets

(56) References Cited

U.S. PATENT DOCUMENTS

| | | | |
|---|---|---|---|
| 2,496,402 A | 2/1950 | McVeigh et al. | |
| 2,546,582 A | 3/1951 | Baker | |
| 2,797,756 A | 7/1957 | Hall, Sr. | |
| 2,824,613 A | 2/1958 | Baker et al. | |
| 2,855,052 A | 10/1958 | Wright et al. | |
| 2,962,313 A | 11/1960 | Conrad | |
| 2,998,848 A * | 9/1961 | Wright et al. | 166/241.6 |
| 3,200,884 A | 8/1965 | Solum et al. | |
| 3,292,708 A | 12/1966 | Mundt | |
| 3,563,575 A | 2/1971 | Sanford | |
| 3,652,138 A | 3/1972 | Collett | |
| 3,916,998 A | 11/1975 | Bass, Jr. et al. | |
| 4,363,360 A | 12/1982 | Richey | |
| 5,501,281 A | 3/1996 | White et al. | |
| 5,706,894 A | 1/1998 | Hawkins, III | |
| 5,860,760 A | 1/1999 | Kirk | |
| 5,908,072 A | 6/1999 | Hawkins | |
| 6,679,335 B2 | 1/2004 | Slack et al. | |
| 7,159,619 B2 | 1/2007 | Latiolais, Jr. et al. | |
| 2003/0000607 A1 | 1/2003 | Jenner | |

OTHER PUBLICATIONS

Buytaert, "PCT International Search Report and Written Opinion", dated Oct. 20, 2010, 14 pages.

\* cited by examiner

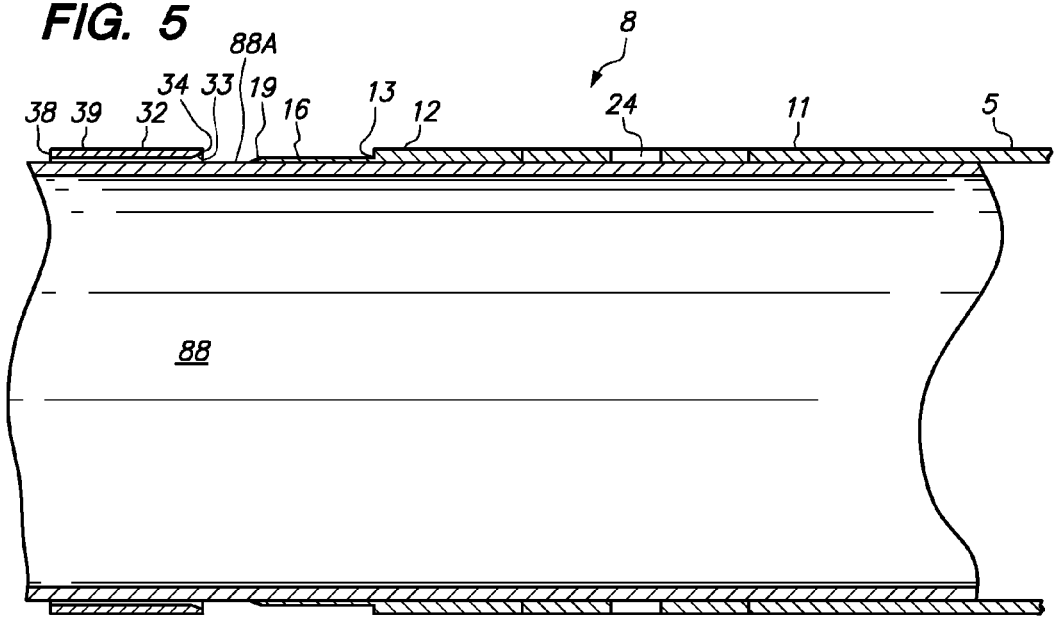
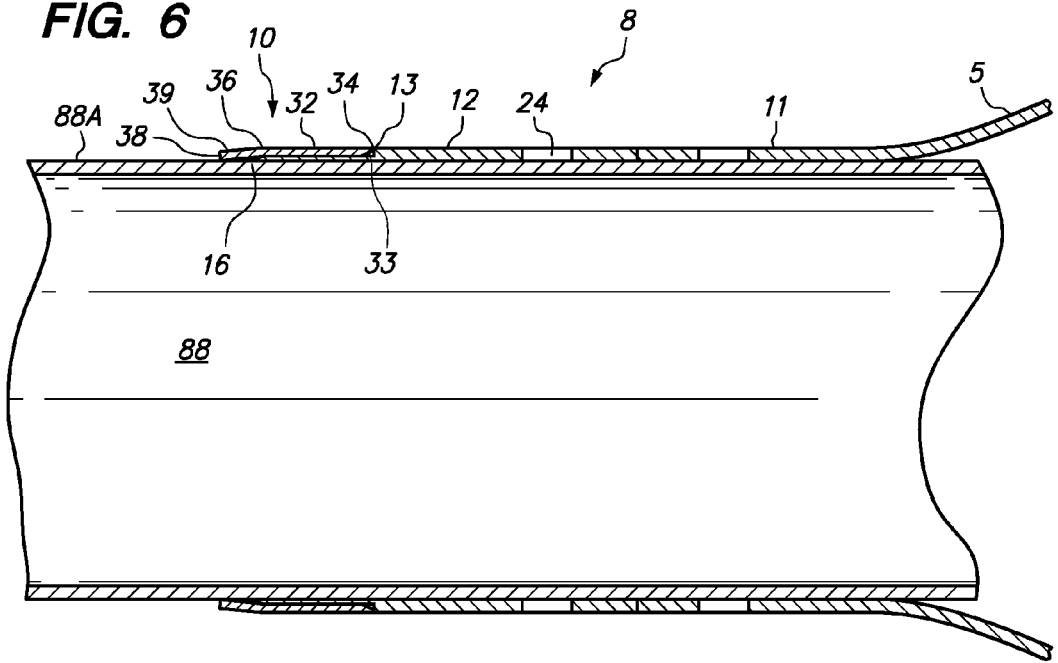

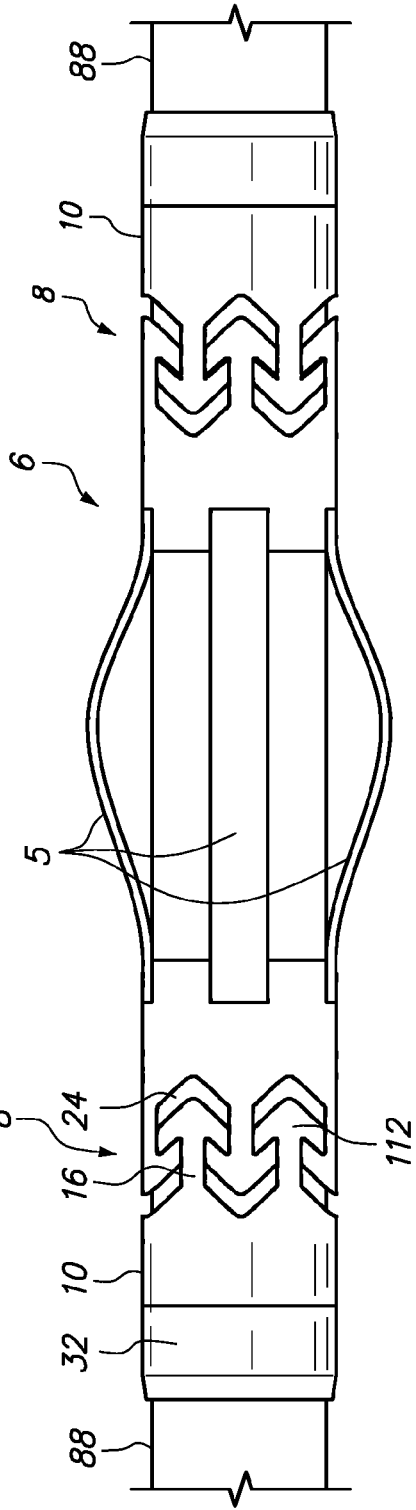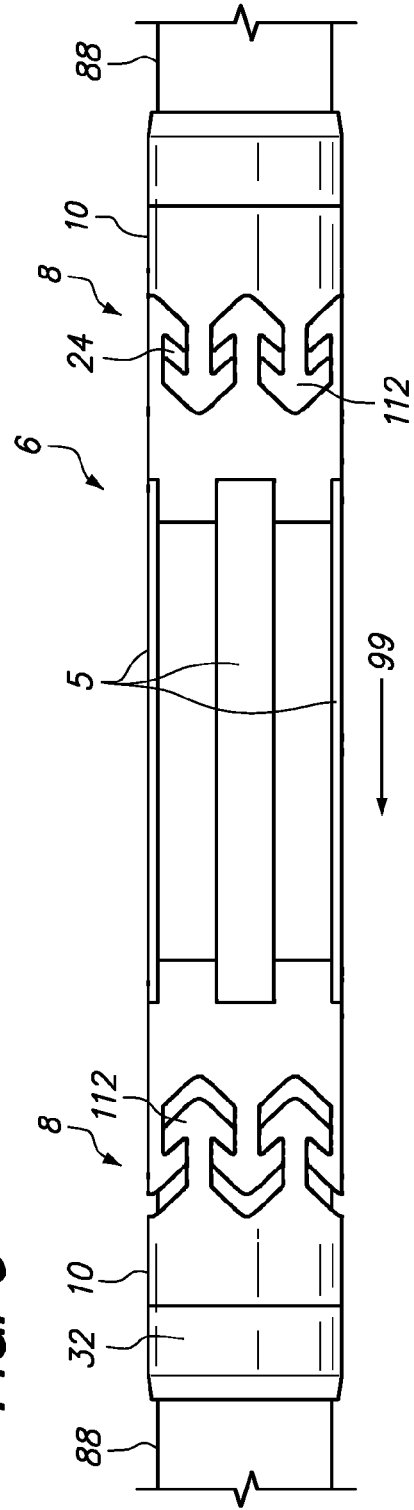

CASING CENTRALIZERS HAVING FLEXIBLE BOW SPRINGS

CROSS-REFERENCE TO RELATED APPLICATIONS

This application is a continuation-in-part of U.S. Non-Provisional application Ser. No. 11/749,544 filed on May 16, 2007, now U.S. Pat. No. 7,845,061. This application also depends from and claims priority to U.S. Provisional Application No. 61/287,665 filed on Dec. 17, 2009; U.S. Provisional Application No. 61/237,202 filed on Aug. 26, 2009; U.S. Provisional Application No. 61/221,716 filed on Jun. 30, 2009; and U.S. Provisional Application No. 61/167,482 filed on Apr. 7, 2009.

BACKGROUND OF THE INVENTION

1. Field of the Invention

This invention is directed to casing centralizers having flexible bow springs for use in borehole completion operations, and particularly to centralizers that may be radially collapsed to pass through a small annular space, and that can deploy to generally center a casing within a borehole.

2. Description of the Related Art

Centralizers are commonly secured at spaced intervals along a casing or tubing string to provide radial stand-off of the casing or tubing from the interior wall of a borehole in which the string is subsequently installed. The centralizers generally comprise generally aligned collars defining a bore there through for receiving the casing, and a plurality of angularly-spaced ribs that project radially outwardly from the casing string to provide the desired stand-off from the interior wall of the borehole. Centralizers ideally center the casing within the borehole to provide a generally uniform annulus between the casing string exterior and the interior wall of the borehole. This centering of the casing string within the borehole promotes uniform and continuous distribution of cement slurry around the casing string during the subsequent step of cementing the casing string within an interval of the borehole. Uniform cement slurry distribution results in a cement liner that reinforces the casing string, isolates the casing from corrosive formation fluids, and prevents unwanted fluid flow between penetrated geologic formations.

A bow-spring centralizer is a common type of centralizer that employs flexible bow-springs as the ribs. Bow-spring centralizers typically include a pair of axially-spaced and generally aligned collars that are coupled one to the other by a plurality of bow-springs. The flexible bow-springs are predisposed to deploy and bow radially outwardly away from the axis of the centralizer to engage the interior wall of the borehole and to center a casing received axially through the generally aligned bores of the collars. Configured in this manner, the bow-springs provide stand-off from the interior wall of the borehole, and may flex or collapse radially inwardly as the centralizer encounters borehole obstructions or interior wall of the borehole protrusions into the borehole as the casing string is installed into the borehole. Elasticity allows the bow-springs to spring back to substantially their original shape after collapsing to pass a borehole obstruction, and to thereby maintain the desired stand-off between the casing string and the interior wall of the borehole.

Some centralizers include collars that move along the length of the casing in response to flexure of the bow springs. For example, U.S. Pat. No. 6,679,325 discloses, in part, a low-clearance centralizer having an extendable collar at each end, each extendable collar comprising a moving collar and a stop collar that cooperate to form an extendable collar. The extendable collar at each end of the centralizer of the '325 patent includes a longitudinal bore within the aligned extendable collars for receiving the casing to which the stop collars are secured to position the centralizer on the casing. Each moving collar has a collet with a radially outwardly flanged portion for being movably received within an interior circumferential groove or bore within the mating stop collar. A plurality of flexible bow springs are secured at each end to a moving collar, and the two moving collars are maintained in a variable spaced-apart relationship by the bow springs and the stop collars.

A shortcoming of the centralizer of the '325 patent is that the stop collar and the moving collar require axially overlapping structures in order to slidably interface one with the other. This overlapping structure adds to the radial thickness of a centralizer of comparable strength, thereby increasing the minimum collapsed diameter of the casing centralizer and limiting the borehole restrictions through which the centralizer and a casing can pass.

The radial thickness added to the exterior of a casing string by an installed centralizer is but one factor to be considered in selecting a centralizer for a given application. The cost of manufacturing the centralizer is also an important consideration. Many movable collars require the manufacture of complicated mechanisms as compared with simple stationary collars. Even less complicated designs include moving collars that are assembled using multiple components, each of which must be separately manufactured and subsequently assembled into a moving collar. While the end result is useful, the costs of manufacturing multiple components, and the costs associated with assembling the components into a centralizer, make these devices relatively expensive. Thus, there is an ongoing need for centralizers having extendable collars that are radially thinner, but less expensive to manufacture and assemble.

SUMMARY OF THE PRESENT INVENTION

The present invention provides a low-clearance and efficiently manufactured centralizer for use in centering a casing within an earthen borehole. The low-clearance centralizer comprises a stop collar having a bore, the stop collar securable to the exterior of a casing in a spaced-apart relationship to an opposing stop collar having a generally aligned bore, the opposing stop collar also securable to the exterior of the casing. Each stop collar is movably interlocked with and cooperates with a moving collar that is formed along with the stop collar from a single tube. Each moving collar is secured to its stop collar using a circumferentially interlocking structure to form an extendable collar. The moving collar is secured to the ends of a plurality of bow-springs. In an optional embodiment, the plurality of bow springs may be formed from the same single tube from which one or more extendable collars are formed.

The bow springs of the centralizer of the present invention are modified—after being cut from the tube—to bow radially outwardly and thereby deploy against an interior wall of the borehole to provide stand-off between the casing and the interior wall of the borehole. The bow springs are sufficiently flexible to elastically collapse from the deployed condition to a collapsed condition to lie generally along the length of the exterior wall of the casing received within the centralizer. A portion of the arc length of the bow springs in their deployed (or bowed) condition is receivable within the retracted length of one of the extendable collars. The centralizer of the present invention is adapted for being pulled through a tight restriction in the borehole by the leading extendable collar. The extendable collars may be designated as a leading collar and a trailing collar, depending on the direction of movement of the casing string and the centralizer affixed thereon. As the deployed bow springs encounter a borehole restriction, the leading extendable collar is extended to its greatest length upon being introduced into the borehole restriction; that is, the leading moving collar, and the bow springs secured at a leading end to the leading moving collar, slide—according to the collapsing force imparted to the bow springs by the borehole restriction—to an extreme configuration for separation of the leading stop collar from the leading moving collar to fully extend the leading extendable collar. As the bow springs continue to collapse to lie generally flat along the exterior surface of the portion of the casing between the leading and trailing extendable collars, a portion of the arc length from previously bowed and deployed bow springs is generally straightened and received within the stroke of the trailing extendable collar as it retracts to a shorter length. Upon passage of the bow springs of the centralizer through the borehole restriction, the resiliency of the bow springs restore the bow springs to their radially outwardly deployed condition and both the leading and the trailing extendable collars are restored to their extended condition, unless the centralizer continues to be shaped by some outside force such as frictional contact between the deployed bow springs and the interior wall of the borehole.

The low-clearance centralizer of the present invention achieves its low-clearance design as a result of the inventive method of making the centralizer from a tube. Preferably, a laser is used to cut a tube into three interlocking pieces comprising two stop collars at the ends, and a center assembly, comprising two moving collars with a plurality of bow springs, intermediate the two moving collars. Alternately, a high pressure water nozzle may be used to create a water jet to cut the tube wall. The centralizer formed in this manner from a single tube in accordance with the present invention comprises two extendable collars, each extendable collar comprising one of the stop collars movably interlocked with the adjacent moving collar of the center assembly. The movement between a stop collar and the adjacent moving collar is provided by cutting the tube into an interlocking pattern and by strategically cutting and removing coupons from the interlocked wall of the tube to facilitate axial movement, but not rotation, between the stop collar and the adjacent moving collar. The cutting and removal method of the present invention results in protrusions extending from one of either the moving collar or the stop collar, or both, being slidably captured within a chamber cut into the other.

BRIEF DESCRIPTION OF THE DRAWINGS

FIG. 5 is a cross-sectional side elevation view of the one end of the centralizer of FIG. 3 taken along section line 5-5, where the centralizer is received on a casing section in preparation for securing a stop collar of the extendable collar to the casing.

FIG. 6 is a cross-section side elevation view of the one end of the centralizer of FIG. 4 taken along section line 6, with the stop collar secured to the casing using a sleeve, a moving collar of the extendable collar in an extended position, and the plurality of bow springs radially outwardly deployed.

FIG. 7 is a side elevation view of the centralizer secured to the casing at both ends in accordance with FIGS. 4 and 6 with the bow springs of the centralizer in a radially outwardly deployed position for centering the centralizer within a bore hole.

FIG. 8 is a side elevation view of the centralizer secured to the casing at both ends in accordance with FIGS. 4 and 6, but with the bow springs of the centralizer collapsed to lie along a portion of the exterior of the casing and one of the extendable collars retracted to receive a portion of the arc length surrendered by the bow springs upon collapse.

DETAILED DESCRIPTION OF THE PRESENT INVENTION

Figure 1:
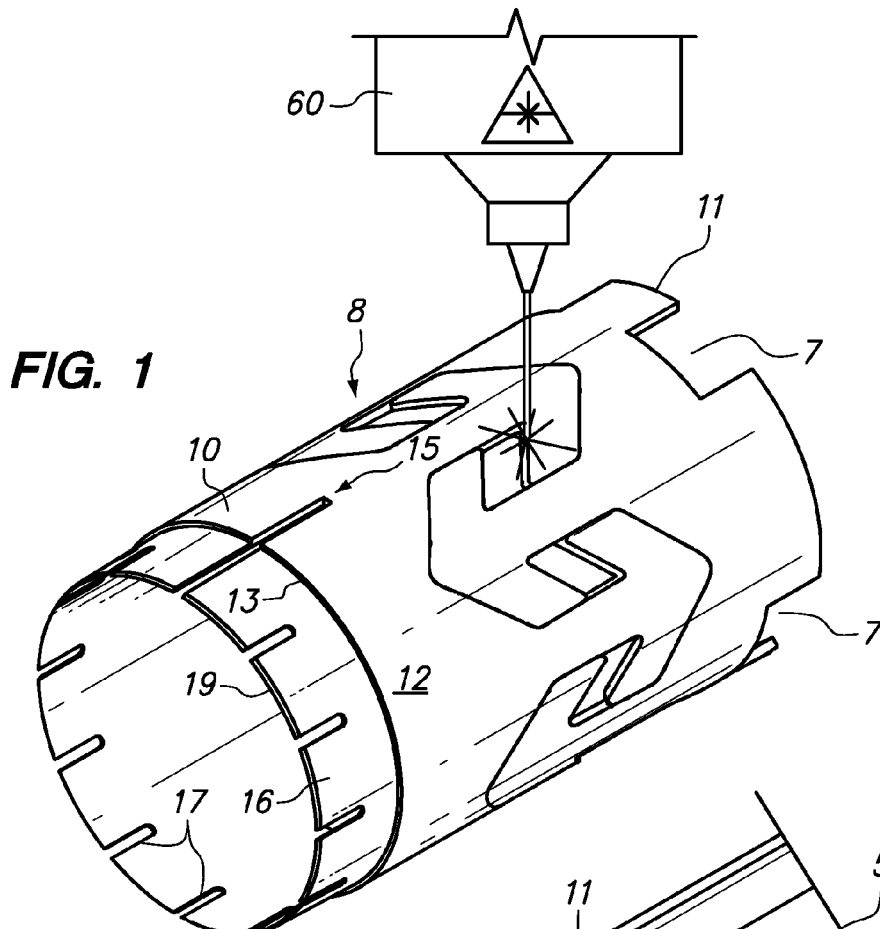
FIG. 1 is a perspective view of a tube or pipe illustrating the cuts for making an extendable collar for use in making one embodiment of the centralizer of the present invention.

The present invention provides a centralizer and a method of securing a centralizer to a casing. The centralizer of the present invention comprises a plurality of bow springs secured between first and second collars, wherein at least one of the collars is an extendable collar. Each extendable collar is cut from a tube, using a laser or some other device for precision cutting the wall of a tube, to form a stop collar and moving collar. The stop collar includes one or more fingers that extend along the surface of the casing to which the centralizer is received, as well as a sleeve received over the one or more fingers to form an interference fit with the casing.

One or more aspect of the centralizer, or the method of securing a centralizer to a casing, may be described in one of the following related applications. Accordingly, this application incorporates by reference the description provided in U.S. Non-Provisional application Ser. No. 11/749,544 filed on May 16, 2007; U.S. Provisional Application No. 61/287,665 filed on Dec. 17, 2009; U.S. Provisional Application No. 61/237,202 filed on Aug. 26, 2009; U.S. Provisional Application No. 61/221,716 filed on Jun. 30, 2009; and U.S. Provisional Application No. 61/167,482 filed on Apr. 7, 2009.

In one embodiment of the method of the present invention, a tube is cut, preferably using a laser, along a pre-programmed pattern to remove generally elongate material coupons to form an open-ended and generally tubular cage having a plurality of generally parallel ribs. The ribs are preferably equi-angularly distributed about the axis of the tube. At each end of the cage, and after the ribs of the cage are formed into bow springs, the remaining portions of the tube are cut to form a pair of opposed extendable collars, each comprising a stop collar and a moving collar. The stop collar and moving collar of each extendable collar are permanently interlocked one with the other unless one or both are deformed from their generally tubular shape to be separated.

The stop collar and the moving collar are formed, one adjacent to each end of the cage, by cutting the tube wall in a circumferentially interlocked configuration, and by strategic removal of material coupons from the wall of the tube. The stop collar and the moving collar formed thereby are generally rotatably locked, but axially movable, one relative to the other. The range of axial movement between the stop collar and the moving collar is determined by the axial length of the removed material coupons and the configuration of the portions of the pattern that extend along the axis of the tube.

In alternative embodiments, each extendable collar is separately cut from a tube without being integrally connected by a plurality of ribs or bow springs. Rather a centralizer may be assembled by securing the ends of a plurality of bow springs between two collars, where at least one of the two collars is an extendable collar cut from a tube.

The interlocked configuration cut into the tubular wall in forming each extendable collar may vary in geometrical shape. Generally, the interlocked configuration comprises two interlocked tubular members, namely a stop collar and a moving collar. Each interlocked tubular member of the extendable collar includes a plurality of circumferentially distributed heads, each head integrally formed on the end of an extension that extends axially from the member. Each head is captured within a circumferential chamber that is preferably formed intermediate adjacent extensions from the opposite interlocked member. The axial extensions from the stop collar, which are shaped from the wall of the tube, are integrally formed with heads that are slidably captured within chambers that are cut into the wall of the tube from which the moving collar is formed. Also, the axial extensions from the moving collar, which are shaped from the wall of the tube, are integrally formed with heads that are slidably captured within chambers that are cut into the wall of the tube from which the stop collar is formed. The heads connected to the extensions may have a variety of shapes, such as generally rectangular, arrow-shaped or bulbous or teardrop-shaped, but all are generally curved with the radius of the wall of the tube from which the extendable collars/extension/heads are cut.

Each head is integrally formed with a generally central axially-oriented extension intermediate the head and the body of the tubular member (i.e., the stop collar or the moving collar). Each head is axially movably captured within one of a plurality of chambers formed within the tubular member. Consecutive, angularly distributed extensions of the first tubular member define the side walls of a chamber in which a head of the opposing second tubular member is movably captured (the "captured head"), and vice-versa. The body of the first tubular member may provide an end wall of a chamber within the first tubular member for limiting movement of the captured head extending from the second tubular member in the axial direction. Each extension from a tubular member is slidably received within the space between adjacent heads of the other tubular member. The heads integrally formed on consecutive extensions of the first tubular member limit axial movement of the captured head extending from the second tubular member. The first and second tubular members are, thereby, rotatably locked one relative to the other, and axially movable one relative to the other between a retracted configuration corresponding to the shorter configuration of the extendable collar and an extended configuration corresponding to the longer configuration of the extendable collar.

In the extended configuration, each captured head of one tubular member abuts the heads on the interlocked tubular member that, in part, define a portion of the chamber. In the retracted configuration, the captured heads may, but do not necessarily, abut the end walls of the respective chamber (see discussion of allowance for debris accumulation below). Thus, the first and second tubular members are "slidably interlocked" within a defined range of axial movement between the extended and retracted configurations.

In one embodiment, a stop collar comprises a base having a bore receivable onto a tubular, one or more fingers extending from the base in a first direction along the exterior of the tubular, and a sleeve with a bore receivable onto the tubular and onto the fingers extending from the base in an interference-fit. The base and the sleeve may be coupled, one to the other, and both to the tubular, by receiving the sleeve over at least a portion of the fingers to form an interference-fit stop collar. The resulting large grip area secures the stop collar firmly to the tubular. In one embodiment, the sleeve may be disposed toward the leading end of the tubular (e.g., the first end to enter the bore) so that friction and/or impacts with bore restrictions urge the sleeve further onto the fingers of the base in a self-tightening mode.

An embodiment of a method of securing a stop collar to a tubular includes the steps of receiving a bore of a base on a tubular with a set of fingers (comprising at least one finger) extending from the base along the exterior of the tubular, receiving the bore of a sleeve on the tubular adjacent the set of fingers, and receiving the bore of the sleeve on at least a portion of the set of fingers in an interference-fit. The elasticity of the sleeve material maintains a grip on the portion of the set of fingers within the bore of the sleeve.

The load capacity of a stop collar formed using the method disclosed herein is superior to that of conventional stop collars. Further, an embodiment of a stop collar installed on a tubular using the method disclosed herein will grip the tubular without marking, scratching or scoring the exterior of the tubular. As a result of the large grip area and the generally uniform grip pressure across the grip area, embodiments of stop collars disclosed herein provide excellent load capacity with minimal contribution to the effective P.O.D.

The outer diameter of tubulars may vary by about 2%. In an alternate embodiment of the stop collar disclosed herein, the base may comprise a bore interrupted by a gap passing through a wall of the base. The gap may, in one embodiment, be longitudinal, e.g., parallel to the axis of the bore of the base. This configuration provides a base with a bore that is variable within a limited range determined by the elasticity of the base material, and a bore that can flexibly accommodate tubular outer diameter. For example, the bore of a base may be enlarged by flexibly widening the gap to expand the bore to receive a tubular having an outer diameter larger than a relaxed diameter of the bore of the base. As another example, a bore of a base may be reduced by flexibly closing (e.g., narrowing) the gap, e.g., to cause the base to fit more snugly on a portion of a tubular having an outer diameter smaller than the relaxed diameter of the bore of the base. Optionally, a clamp may be used to conform the bore of the base to the tubular exterior, and the clamp may also serve to secure the base to the tubular during the installation of a sleeve on the set of fingers. The presence of a gap in the wall of the bore of the base makes the stop collar more compatible with expandable tubulars because the base will plastically deform, by opening of the gap, as the tubular on which the stop collar is installed expands. The base opens at the gap and remains on the exterior of the expanded tubular instead of breaking upon expansion of the tubular and becoming unwanted debris in the bore.

In another embodiment for accommodating tubular outer diameter, the base may comprise two or more separate portions, each having an arc span of a radius generally corresponding to the outer diameter of the tubular on which the stop collar is to be installed. For example, but not by way of limitation, two or more separate base portions may each comprise one or more fingers, and the two or more separate base portions may be positioned one generally adjacent the other (s) on the exterior of a tubular and secured in their positions on the tubular using a clamp. A bore of a sleeve may be received on the tubular adjacent the fingers extending from the adjacent base portions, and the bore of the sleeve may be received onto at least a portion of the fingers in an interference-fit to form a stop collar and to secure the two or more base portions one adjacent the other(s). This embodiment of the stop collar may comprise, for example, two base portions having up to 180 degrees of arc span, three base portions having up to 120 degrees of arc span, etc. It is not necessary that the separate base portions have the same arc span, only the same approximate arc radius, and it is not necessary that the cumulative arc span of the base portions sum to 360.

In one embodiment, the base may have an outer diameter generally equal to the outer diameter of the sleeve, post-installation. This structure provides an embodiment of a stop collar having a generally uniform, flat surface across the interface of the base and the installed sleeve.

An embodiment of a method of installing a stop collar on a tubular includes a step of providing a plurality of sleeves having a range of bore diameters to provide favorable matching of the bore of the sleeve to the diameter around the fingers of the base. For example, after a base is clamped in a position on a tubular, such as a unitary base or a base having two or more base portions, a sleeve may be selected to provide the tightest available grip on the fingers without being so small as to impair installation of the sleeve onto the fingers.

In another embodiment of a stop collar and method of installing a stop collar on a tubular, one or more of the fingers may be frangible to enable selective removal from the base. An embodiment of the stop collar having a base of this type is compatible for use with a sleeve having a bore that, but for the frangible fingers of the base, would be too small to be installed on the fingers without the use of excessive force.

In one embodiment of the method of installing a stop collar on a tubular, one or more shims may be used to compensate for outer diameter of the tubular or to compensate for a tubular diameter that may be smaller than the diameter of the base. For example, instead of providing a discontinuity through the wall of the base so that the bore of the base can be flexibly conformed to a tubular having an outer diameter smaller than the bore of the base, shims may be inserted between the bore of the base and the tubular, or between the fingers of the base and the tubular, to ensure that the sleeve is received on the fingers in an interference-fit and to ensure that the installed stop collar is firmly secured on the tubular.

In one embodiment of the method of installing a stop collar on a tubular, the extension of the fingers from the base may be increased using alternate shims with, for example, a detent or cavity therein to receive a finger of the base. Extending the fingers using shims may enable the use of a wider sleeve (as measured along an axis of the bore of the sleeve) which, when received onto the extended fingers, may increase the grip area and the resulting holding force of the stop collar.

In one embodiment of a stop collar, a single finger may comprise a modified tubular member having a longitudinal gap in the wall. The single finger may comprise an interior surface generally conforming to the exterior of the tubular on which the finger is received, and a corresponding exterior surface generally conforming to the bore of a sleeve to be received onto the single finger in an interference-fit to form a stop collar. The angular span of curvature of the single finger may be less than 360 degrees to prevent full closure of the gap and/or overlapping of the ends adjacent the gap when the sleeve is installed on the single finger in an interference-fit to form the stop collar.

In one embodiment, the base comprises a fingerless base having a bore cooperating with a set of separated fingers (comprising at least one separated finger) that may be received in, on or against the fingerless base to form a base. In one embodiment, the set of separated fingers may be received in, on or against the fingerless base prior to receiving the sleeve onto the tubular or, in an alternate embodiment of the method, the fingerless base may be received onto the tubular adjacent the sleeve, and then the set of separated fingers may be disposed between the fingerless base and the sleeve. In one embodiment of the method, the separated fingers may be connected to the base by, for example, welding, wedging, or by using an adhesive, after the set of separated fingers are positioned in, on or against the fingerless base. This embodiment of the stop collar and method may substantially reduce the cost of manufacturing the stop collar components without impairing the ease of stop collar installation or load capacity. Separated-finger embodiments of the stop collar and method may substantially reduce labor costs by eliminating the need to machine the base with integral fingers. As with other embodiments, the fingerless base may also be coupled to or formed integrally with a component of a downhole device such as, for example, a packer, a centralizer, wall scratcher or wiper, or some other device to be coupled to a tubular.

In one separated-finger embodiment of the stop collar and method, a base may comprise a groove in a face of the fingerless base to receive a portion of each separated finger. The groove may be disposed in a face of the fingerless base, for example, opposite a packer face of the base. An embodiment of a method of assembling a stop collar using a set of separated fingers may include the steps of receiving the one or more separated fingers to a seated position within a groove in a face of a fingerless base, and then connecting the one or more fingers to the base by, for example, welding, wedging and end of the separated finger into the groove, or using an adhesive. The groove in the base may be continuous about its circumference, for example, to receive a single finger having an angular span of curvature near 360 degrees, or the groove may comprise strategically located dividers to divide the groove into a plurality of sections to receive and/or guide an end of a separated finger to a seated position within a section.

In another separated-finger embodiment of the stop collar and method, the base may comprise a bore with an enlarged bore portion adjacent a face of the base to receive an end portion of the separated fingers therein to a seated position between a wall of the enlarged bore portion and a tubular on which the fingerless base is received. A related embodiment of the method may include the steps of receiving a bore of a fingerless base on a tubular, receiving an end of a set of separated fingers within the enlarged bore portion of the fingerless base to a seated position to form a base, and connecting the set of separated fingers to the fingerless base by, for example, welding or using an adhesive. The embodiment of the fingerless base having an enlarged bore portion may comprise strategically located dividers to divide the enlarged bore portion into sections to receive and/or guide one or more fingers to a seated position within a section.

In another separated-finger embodiment of the stop collar and method, the fingerless base may comprise a backing face disposed at an angle to the bore to engage an end of a set of separated fingers. The backing face may be perpendicular to the bore of the fingerless base or it may be formed at a non-perpendicular angle to the bore. In a stop collar to be used with an expandable packer, for example, the backing face on a fingerless base may be disposed opposite a packer face on the fingerless base. An embodiment of a method of installing a separated-finger embodiment of a stop collar may include the step of abutting ends of the set of separated fingers against the backing face of the fingerless base and connecting the set of separated fingers to the fingerless base by welding or by using an adhesive.

One embodiment of a method of installing a stop collar may include the step of applying an uncured epoxy adhesive to certain components of the stop collar, for example, to the outer surface of a set of one or more fingers (which may be separated fingers) or to the bore of the sleeve, and prior to receiving the bore of the sleeve onto the fingers. The epoxy may perform as a lubricant to facilitate installation of the sleeve onto the set of fingers in an interference-fit and, later, the epoxy may cure to bond the sleeve to the fingers and enhance the grip of the sleeve on the set of fingers. Alternately, or in addition, the method may include a step of applying an uncured epoxy to the tubular and/or to the interior curved surfaces of the set of fingers to promote bonding between the stop collar and the tubular to improve load capacity.

One embodiment of a method of securing a stop collar to a tubular comprises providing a base (which may comprise a fingerless base and separated fingers) having a bore to receive a tubular so that one or more fingers extend from the base along the exterior of the tubular in a first direction, receiving the bore of a sleeve onto the tubular adjacent the fingers extending from the base, heating the sleeve to thermally expand the bore of the sleeve, receiving the expanded bore of the sleeve onto at least a portion of the fingers and heat shrinking the bore of the sleeve onto the fingers in an interference-fit to form a stop collar. The heat shrinking of the sleeve onto the fingers of the base secures the stop collar on the tubular without subjecting the exterior of the tubular to direct contact with the heated sleeve. Heat stored in the expanded sleeve dissipates quickly after the sleeve is received on the fingers of the base due to the large heat sink provided by the tubular and the high conductivity of the stop collar and tubular materials. As a result, embodiments of the stop collar installed using this method may be secured to a tubular without hindering the metallurgical condition of the tubular or the performance of any coatings or liners on the exterior of the tubular. The added steps of thermally expanding the sleeve and then heat shrinking the sleeve onto at least a portion of the fingers may be employed in connection with any of the embodiments described above including, but not limited to, a base having two or more separate portions, a fingerless base cooperating with a set of separated fingers, and a base having two sets of fingers extending in opposite directions one relative to the other.

In one embodiment of a method of installing a stop collar on a tubular, an installation tool may be used to receive the bore of the sleeve onto at least a portion of the set of fingers extending from a base in an interference-fit to form a stop collar. An embodiment of the installation tool may comprise two bodies straddling the base and the sleeve adjacent to the base. One or more drive members, such as a threaded bolt, screw jack, ratchet jack, and/or a fluidic (e.g., pneumatic or hydraulic) cylinder, may be coupled intermediate the first body and the second body of the installation tool and, upon actuation of the drive member(s), the first body and second body adduct one toward the other about the base and the sleeve to install the bore of the sleeve onto the set of fingers to form the stop collar. An installation tool may have a plurality of drive members angularly distributed around the tubular to provide an evenly distributed net force to each of the bodies.

An additional advantage of some embodiments of the stop collar of the invention is that it may be assembled and installed on a tubular of any diameter, and installation may occur in any climate with portable equipment and without specialized labor. The methods of installing a stop collar disclosed herein may be used to assemble and install a stop collar on a tubular of any size and grade and at any location along any tubular segment of a tubular string. The method may be used to install a stop collar with generally portable equipment, and without the expense of specialized tools or highly-skilled labor.

The use of the modifier "stop" within the term "stop collar" should not be considered as limiting the use of the device to couple only stationary or fixed devices. The term "sleeve," as that term is used herein, refers to a member having a bore for receiving a tubular therethrough. In one embodiment, a sleeve may comprise two or more sleeve components that may be interlocked, assembled or coupled together to form the equivalent of a continuous structure about at least a portion of its bore.

A "finger," as that term is used herein, does not mean that the structure to which the term is applied is necessary shaped like a human finger, but instead that it merely extends. A "finger," as that term is used herein, may be, in one embodiment, generally flattened and radially thin, and may comprise an arc-shaped cross-section generally conforming to the exterior of the tubular on which the stop collar is to be coupled and/or to the interior surface of the bore of the sleeve to be received onto the finger to form a stop collar. A "finger" may be, in one embodiment, of uniform width and/or radial thickness along the length of its extension, or the width and/or radial thickness may vary along its length. A slot intermediate two adjacent fingers extending from a common first portion may be uniform or varied along its length, and a slot may or may not be aligned with the longitudinal axis of the tubular on which the stop collar is to be installed. In one embodiment, the fingers and/or slots there between may be spiral and/or helical in shape.

FIG. 1 is a perspective view of a tube illustrating the cuts for making an extendable collar 8 for use in making one embodiment of the centralizer of the present invention. The tube is cut along a pattern by a laser device 60 to form the extendable collar 8. The laser beam contains sufficient energy to cut through the wall of the tube without significantly cutting or affecting the opposing diameter wall when the laser beam penetrates the targeted wall. The first portion of the segment of the tube being cut in FIG. 1 will form the stop collar 10 and the second portion of the segment of the tube will form the moving collar 11 of the centralizer. A variety of lasers capable of cutting metal tubulars are known in the art, and an in-depth discussion of lasers is therefore not warranted herein. As an overview, any suitable type of laser may be used to cut through the wall of a tube according to the present invention. The resulting cut is clean, square and generally distortion-free. Most laser cutting requires short setup times and requires little or no finishing. The strategic removal of a material coupon from the wall of the tube forms an extendable coupling from a single tube.

FIG. 1 also shows a embodiment of a base 12 (e.g., tubular base) that may be used to form one embodiment of the stop collar 10, where the base 12 has a bore to receive a tubular (such as casing) and a set of fingers 16 extending from the base 12. The depicted fingers 16 of the base 12 extend in a first direction along the exterior of the tubular (See exterior 88A of the tubular 88 in FIG. 3), and the depicted fingers 16 are angularly distributed about the base 12 and separated by a plurality of slots 17. Base 12 may comprise a gap 15 to allow variation of the diameter of the bore of the base 12, e.g., by elastic deformation of the base 12 to close or open the gap 15. Base 12 may comprise a stop wall 13 to limit the extent to which a sleeve may be received onto the fingers 16. Fingers 16 may be coextensive, e.g., in equal axial length of extension from the base 12. Fingers 16 may comprise a taper (not shown) along their length or along a portion the length of extension from the base 12, and/or the fingers 16 may comprise a bevel 19 to engage and guide a sleeve (not shown—see sleeve 32 in FIG. 4) to a received position around the fingers 16.

Figure 2:
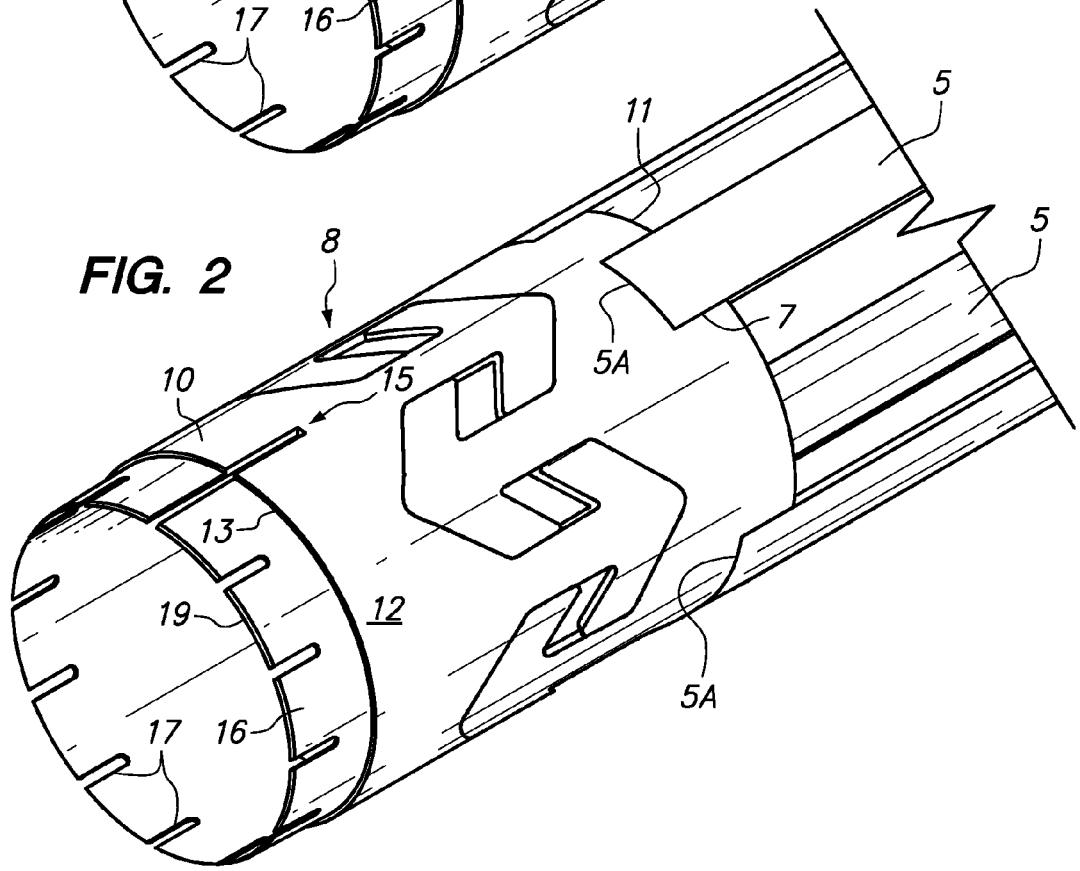
FIG. 2 is a perspective view of one end of a centralizer including the extendable collar of FIG. 1 secured to a plurality of bow springs.

FIG. 2 is a perspective view of one end of a centralizer including the extendable collar 8 of FIG. 1 secured to a plurality of bow springs 5. The plurality of bow springs 5 may each be separately formed, such as in a bowed configuration. The ends 5A of each bow spring 5 is secured, such as by welding, in the recess 7 in the end of the movable collar 11.

Figure 3:
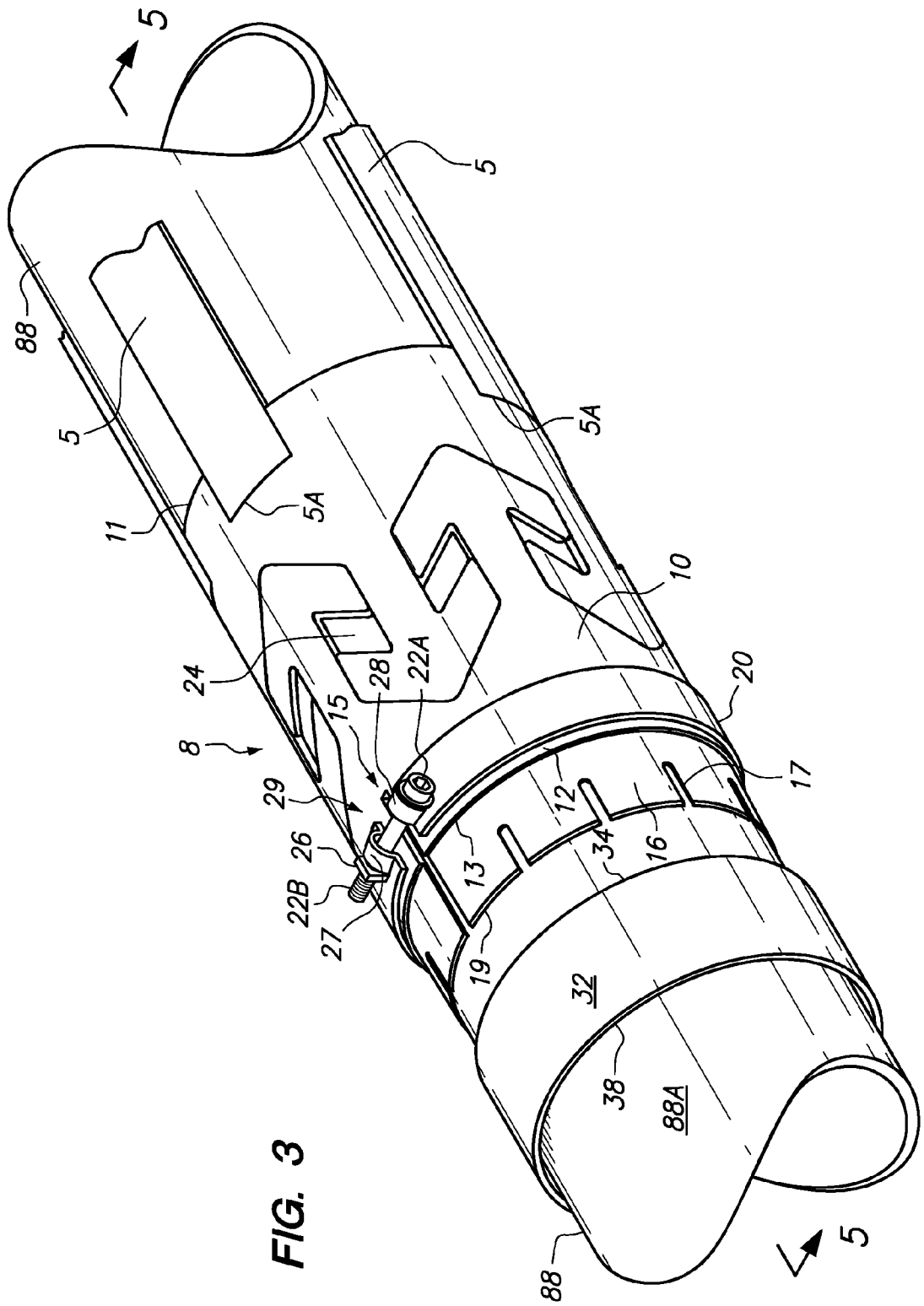
FIG. 3 is a perspective view of the one end of the centralizer of FIG. 2, where the centralizer is received on a casing section in preparation for securing a stop collar of the extendable collar to the casing.

FIG. 3 is a perspective view of the one end of the centralizer of FIG. 2, where the centralizer is received on a casing section 88 in preparation for securing a stop collar 10 of the extendable collar 8 to the casing. The bore of a sleeve 32 is received onto the casing 88 and an optional clamp 20 is applied to secure the base 12 in a position on the casing 88. A bore of a sleeve 32 received onto the tubular 8 is shown positioned adjacent the fingers 16 extending from the base 12. The clamp 20 comprises a fastener 29 having a head 22A adapted for being engaged and turned by a tool (not shown) and a nut 26 threadably received on a shaft 22B, although other types of clamps or similar devices may be used without departing from the spirit of the invention. Depicted retainer channels 27 and 28 receive the shaft 22B so that the clamp 20 may be opened or closed by rotation of the head 22 of the fastener 29 using a tool (not shown). In one embodiment, once the clamp 20 is applied to secure the base 12 in position on the tubular 8 as shown in FIG. 3, the sleeve 32 may be received onto the fingers 16.

Clamping of the base 12 is optional, and the base 12 may, in lieu of or in addition to the application of a clamp, be secured in position on the casing 88 by, for example, but not by way of limitation, elastically expanding the base 12 by enlarging the gap 15 and then positioning the expanded base 12 on the tubular 8 so that it will grip the casing 88 upon release from the expanded condition. Additionally or alternately, a sleeve hammer, e.g., one of substantial mass, may be disposed on the casing 88 adjacent the base 12 to back-up the base 12 and restrict movement of the base 12 along the casing 88 and away from the sleeve 32. Other methods of and structures for limiting or preventing movement of the base 12 along the casing 88 may be used, and are within the scope of the appended claims. A sleeve hammer may be used to strike end 38 of the sleeve 32 to drive the sleeve 32 onto the fingers 16 to install the stop collar. Alternately, a machine, for example, but not by way of limitation, an installation tool may be used to dispose the sleeve 32 onto the fingers 16 extending from the base 12 while also applying a generally equal and opposite reaction force to the base 12. The relative diameters of the sleeve and the one or more fingers form an interference fit with the surface 88A of the casing 88 to secure the stop collar 10 in position.

FIG. 3 also shows the extendable collar 8 of the centralizer in the retracted position. It is clear that the removal of a generally larger coupon of material from the region 24 of the wall of the tube used to make the expandable collar 8 and to form the chamber will minimize the potential for an accumulation of debris clogging or otherwise preventing full retraction of the extendable collar 8.

Figure 4:
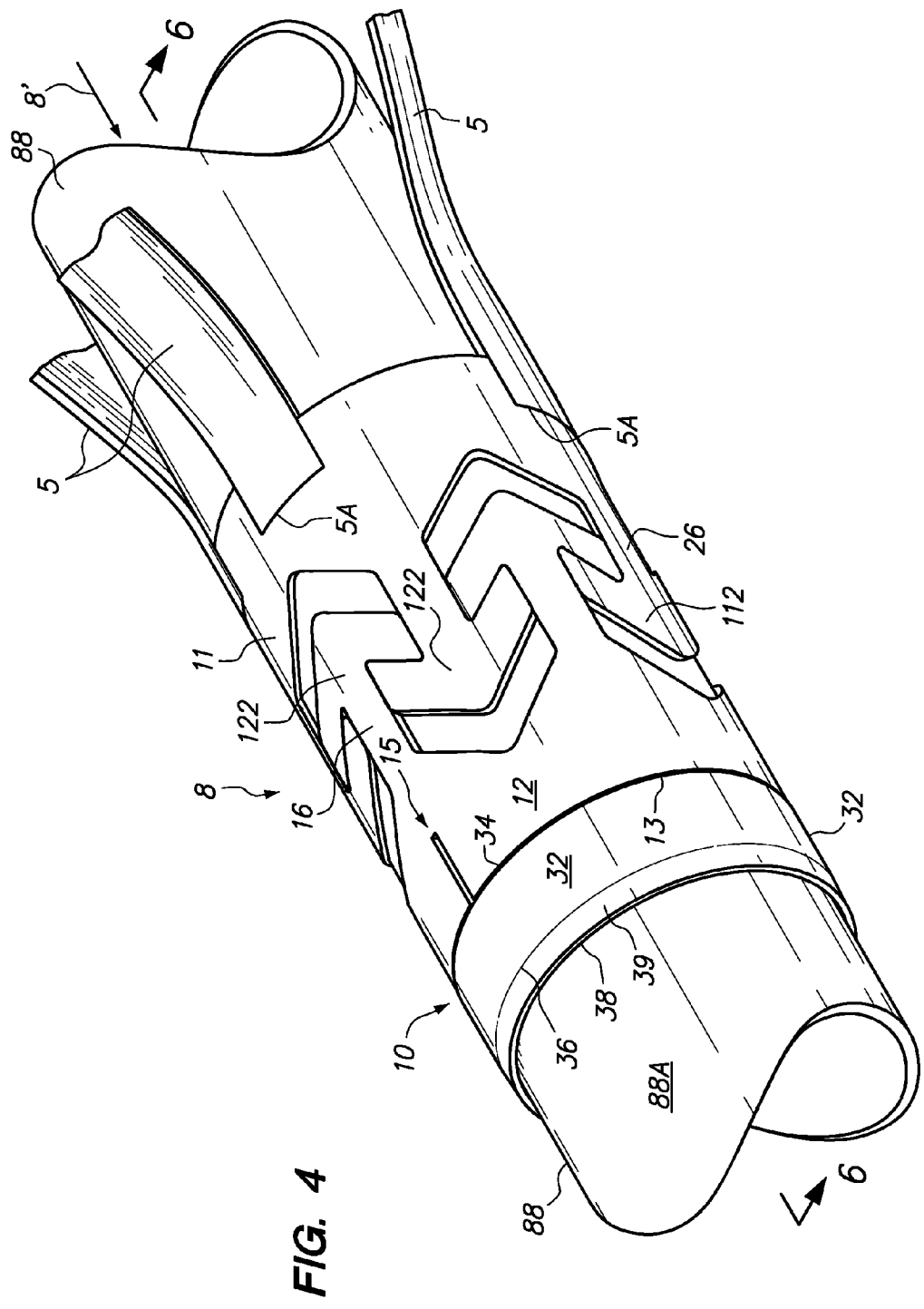
FIG. 4 is a perspective view of the one end of the centralizer of FIG. 3 with the stop collar secured to the casing using a sleeve, a moving collar of the extendable collar in an extended position, and the plurality of bow springs radially outwardly deployed.

FIG. 4 is a perspective view of the one end of the centralizer of FIG. 3 with the stop collar 10 secured to the casing 88 using the sleeve 32. The moving collar 11 of the extendable collar 8 is in an extended position, and the plurality of bow springs 5 are radially outwardly deployed. As the centralizer moves through a bore hole, the moving collar 11 is able to retract back to the position shown in FIG. 3. The stop collar 10 is formed by receiving the bore of the sleeve 32 onto the fingers 16 (not shown in FIG. 4—see FIG. 3) extending from the base 12. Using a tool, such as a sleeve hammer, an installation tool or other implement, the sleeve 32 is moved from the position shown in FIG. 3 onto the fingers 16 in an interference-fit. The sleeve 32 may be guided into a position on the fingers 16 by an optional bevel 19 (e.g., FIG. 3). Stop collar 10 may securely grip the casing 88 with the sleeve 32 received on only a portion of the fingers 16, or the sleeve 32 may be received along the full extension of the fingers 16 to an abutting position with the stop wall 13 as shown in FIG. 4.

Optionally, as illustrated in the embodiment of the stop collar 10 in FIG. 3 (pre-assembly) and FIG. 4 (post-assembly), the width of the sleeve 32 may be greater, in a direction along the axis of the casing 88, than the length of extension of the fingers 16 from the base 12. In this configuration, the fingers 16 (concealed by the sleeve 32 in FIG. 4) do not extend along the casing 88 the full width of the bore of the installed sleeve 32, and a portion of the sleeve 32 received onto the fingers 16 may elastically expand to an outer diameter greater than an adjacent portion of the sleeve 32 that lies beyond the extension of the fingers 16. This may result in a transition ridge 36 at which the sleeve 32 begins to taper, as shown in FIG. 4, imparting a "bullet-nosed" or tapered portion 39 adjacent an end 38 of the assembled stop collar 10. The optional taper may facilitate movement of the stop collar during through restrictions. In one embodiment of a method of installing a stop collar, the sleeve 32 may be disposed toward a leading end of a tubular (e.g., an end of the tubular to be first inserted into a bore hole) to cause friction on and impacts to the sleeve 32 to urge the sleeve 32 toward an installed configuration on the fingers 16.

FIG. 4 also shows the interlocking interrelationship of the heads 112 and 122 of the stop collar 10 and the moving collar 20, respectively. The stop collar 10 includes heads 122 and the extensions 16 and the moving collar 11 includes the heads 112 and the extensions 26. The extended position of the extendable collar 8 shown is FIG. 4 is the configuration of the extendable collars in a centralizer of the present invention when the bow springs 5 are deployed to pull the moving collars 11 inwardly toward the center of the centralizer 6, as shown in FIG. 7. Alternately, the extended position of the extendable collar 8 shown is FIG. 8 is the configuration of the leading extendable collar in a centralizer 6 of the present invention when the centralizer 6 is being drawn through a borehole restriction or past a borehole protrusion that presents an obstacle for the bow springs to pass in their deployed condition. An extendable collar will generally be a leading collar if it is the bottom extendable collar of the centralizer 6 being lowered into a borehole on a casing or, if it is the trailing collar, if it is the top extendable collar of the centralizer 6 being pulled upwardly toward the surface through a borehole restriction or past a interior wall of the borehole protrusion that presents an obstacle for the bow springs to pass in their deployed condition.

FIG. 5 is a cross-sectional side elevation view of the one end of the centralizer of FIG. 3 taken along section line 5-5, where the centralizer is received on a casing section 88 in preparation for securing a stop collar of the extendable collar to the casing. This view of the base member 12, the sleeve 32 and the casing 88 of FIG. 3 shows the relative thicknesses and diameters of the base 12, the fingers 16 extending from the base 12, the sleeve 32 and the wall 88A of the casing 88. The clamp 20 (see FIG. 3) is omitted from the section view of FIG. 6 to better illustrate the relative thicknesses of the components of the illustrated embodiment of the stop collar. FIG. 5 illustrates the clearance between the sleeve 32 and the exterior 88A of the casing 88 to receive the fingers 16 there within and an optional interior bevel 33 on an end 34 of the sleeve 32. The interior bevel 33 on the end 34 may, in one embodiment of the method of installing a stop collar, be disposed to interact with the optional exterior bevel 19 on the fingers 16 to guide the sleeve 32 to a received position around the fingers 16 as shown in FIG. 6.

FIG. 6 is a cross-section side elevation view of the one end of the centralizer of FIG. 4 taken along section line 6-6, with the stop collar 10 secured to the casing 88 using the sleeve 32. The assembled stop collar 10 comprises the base 12, the sleeve 32 and the fingers 16 extending from the base 12 and captured between the sleeve 32 and the exterior 8A of the casing 88. FIG. 6 also illustrates the tapered portion 39 of the depicted sleeve 32 between the transition ridge 36 and the end 38 of the sleeve 32. In other embodiments, the fingers 16 may extend a length equal to the width of the sleeve 32 or beyond the width of the sleeve 32, thereby producing no tapered portion 39.

Dimensions of the various components and structures may vary, and these may be optimized according to the specific application and the specific materials employed. In one embodiment, for example, and not by way of limitation, for a stop collar 10 to be installed on a casing 88 having a P.O.D. of 20.3 cm (8.0 inches), the sleeve 32 may comprise a bore of 20.45 cm (8.05 inches), an axial width of 5.1 cm (2.0 inches) and a radial thickness of 0.35 cm (0.14 inches), as may be shown in FIG. 5. The base 12 to be used with the sleeve 32 may comprise a base 12 having a bore of 20.45 cm (8.05 inches) and a width of 2.54 cm (1.00 inch) from which a plurality of fingers 16 extend a distance of 3.81 cm (1.50 inches) in a first direction, for example, as shown in FIG. 5. The radial thickness of the fingers 16 may be 0.13 cm (0.05 inches), and the width of the slots 17 intermediate the fingers 16 may be 0.645 cm (0.250 inch). These are merely examples of dimensions in one specific embodiment of an interference-fit stop collar, and should not be limiting of the dimensions and structures that may be within the appended claims. The number of fingers that may be disposed on the base 12 may also vary, and that the number of fingers 16 extending from the base 12 illustrated in the appended drawings is merely an example, and should not be deemed as limiting.

FIG. 7 is a side elevation view of the centralizer 6 secured to the casing 88 at both ends in accordance with FIGS. 4 and 6 with the bow springs 5 of the centralizer in a radially outwardly deployed position for centering the centralizer within a bore hole (not shown). Although the centralizer 6 is shown having an extendable collar at both ends, one of the extendable collars may be substituted with a collar of another type. For example, a simple sliding collar may be used in combination with a simple stop collar, such as a stop collar securable to the casing 88 in a number of ways, including the use of set screws which tighten to grip the casing 70 within the stop collar 10, by use of epoxy adhesive being applied and cured in epoxy retaining apertures. This later method of securing a centralizer to a casing is described in more detail in a patent application filed on Jun. 28, 2006 and assigned U.S. Ser. No. 11/427,251, and is incorporated by reference into this disclosure.

The bow springs 5 are shown in their radially outwardly deployed configuration to provide stand-off from an interior wall of the borehole during installation of the casing 88 into a borehole. Each of the upper and lower extendable collars 8 are shown in the extended configuration as the deployed bow springs 5 pull the moving collars 20 toward the center portion of the centralizer 6 and away from the stop collars 10 that are secured to the exterior of the casing 88.

FIG. 8 is a side elevation view of the centralizer 6 secured to the casing 88 at both ends as in FIG. 7, but with the bow springs 5 of the centralizer 6 collapsed to lie along a portion of the exterior of the casing 88 and one of the extendable collars 8 retracted to receive a portion of the arc length surrendered by the bow springs upon collapse. When the casing 88 is being run down hole through the bore hole, the extendable collar that retracts will generally be the upper extendable collar. The configuration shown is that which the centralizer 6 is likely to exhibit when the casing 88 is installed into a borehole and the centralizer 6 encounters a borehole restriction through which the centralizer 6 must pass. The configuration of the centralizer 6 shown in FIG. 8 results from the casing 88 being lowered in the direction of the arrow 99 into a borehole with the left-most extendable collar 8 shown in FIG. 8 being the leading collar and the right-most extendable collar 8 being the trailing collar. As the bow springs 5 encounter borehole restrictions or protrusions from the interior wall of the borehole that require the bow springs 5 to collapse inwardly toward the casing 88, the resistance of the bow springs 5 to collapse causes the leading extendable collar 8 to be extended. As the bow springs are further collapsed to their configuration shown in FIG. 8, at least a portion of the arc length of the deployed bow springs 5 (see FIG. 7) is surrendered and absorbed by retraction of the trailing extendable collar 8, which is shown in the retracted configuration in FIG. 8. The trailing or upper extendable collar 8 in FIG. 8 is shown to be fully retracted, that is, there is no capacity of the trailing extendable collar to be further retracted. It is preferred that the extendable collar be structured with excessively sized chambers (see element 24 in FIG. 6) so that an accumulation of dirt or debris within the chamber during installation of the casing 70 in a borehole would not prevent movement of the head (see element 112 of FIG. 6) into the chamber 24 that would prevent the bow springs 5 of the centralizer 6 from fully collapsing to pass through a borehole restriction.

Figure 9:
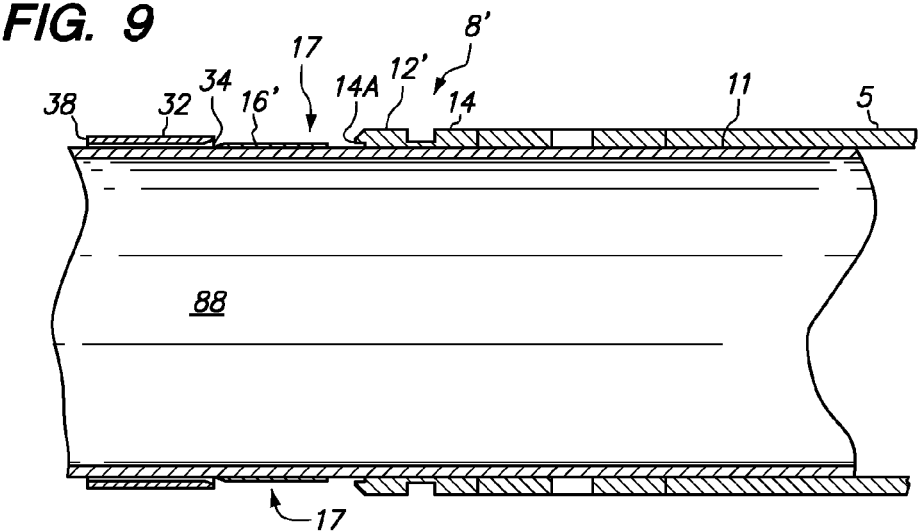
FIG. 9 is a cross-sectional side view of an alternate embodiment of a extendable collar having a stop collar base for receiving and positioning a plurality of separate fingers along the surface of the casing.

FIG. 9 is a cross-sectional side view of an alternate embodiment of a extendable collar 8' having a stop collar base 12' for receiving and positioning a plurality of separate fingers 16' along the surface of the casing 88. The separate fingers 16' are not integrally formed with the base 12' and may be individually manufactured using inexpensive materials and processes. In particular, the use of separate fingers 16' avoids the need to machine A method of securing a stop collar on a tubular includes, in a first step, illustrated by FIG. 9, a stop collar having a fingerless base 14 is received on the casing 88. In a second step, a sleeve 32 is received on the casing 88 adjacent an enlarged bore portion 14A of the fingerless base 14. In a third step, a set of (one or more) separated fingers 16A are moved radially inwardly from a removed position to a position intermediate the sleeve 32 and the enlarged bore portion 14A of the fingerless base 14, as indicated by the arrows 17.

Figure 10:
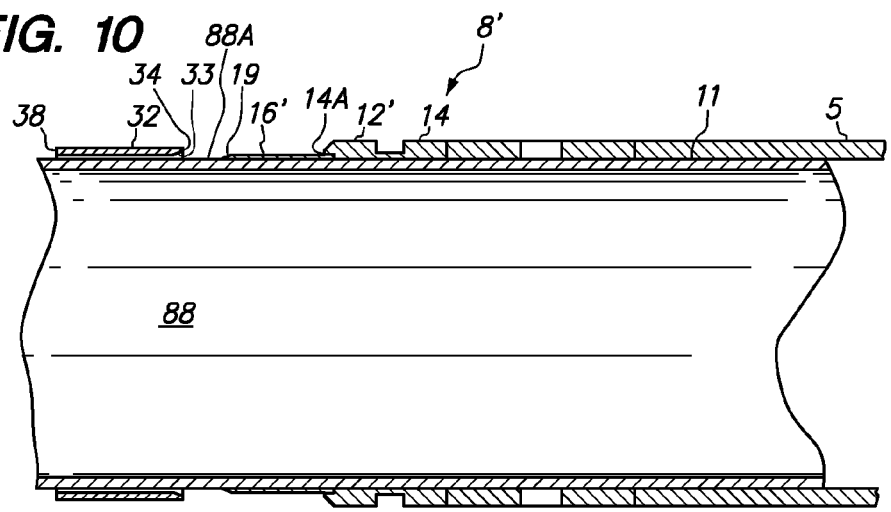
FIG. 10 is a cross-sectional side view of the extendable collar of FIG. 9 with the plurality of separate fingers received by the stop collar base and positioned along the surface of the casing.

FIG. 10 is a cross-sectional side view of the extendable collar 8' of FIG. 9 illustrating a fourth step in which the set of separated fingers 16A are received into the enlarged bore portion 14A of the fingerless base 14 to form a base 12

Figure 11:
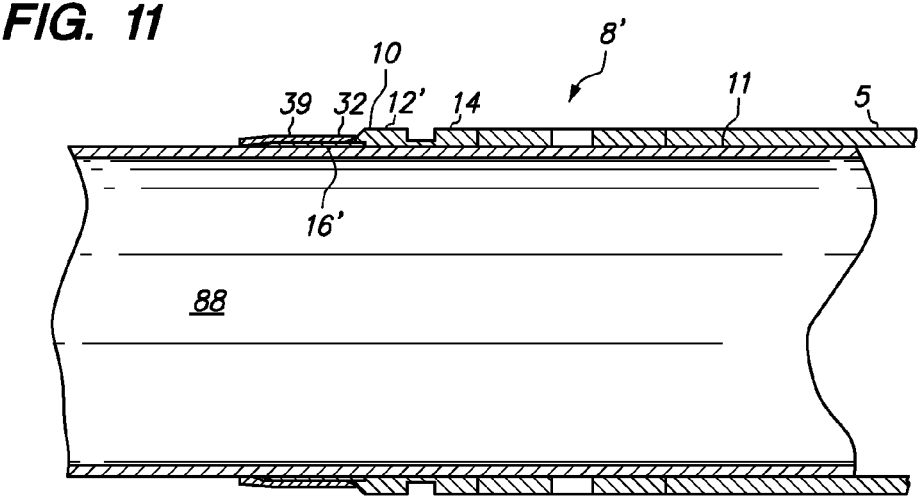
FIG. 11 is a cross-sectional side view of the extendable collar of FIG. 10 having a sleeve secured about the outer surface of the separate fingers to form an interference fit about the casing that limits the stop collar base from sliding beyond the fingers and sleeve.

FIG. 11 is a cross-sectional side view of the extendable collar 8' of FIG. 10 illustrating a fifth step in which the sleeve 32 is received onto the fingers 16A of the base 14 to form a stop collar 10 to limit or prevent movement of the centralizer 6. The method illustrated in FIGS. 9-11 enables efficient storage, packing and shipment of stop collar components, and the stop collar may be assembled using a varying number of separated fingers which may be removed, arranged and/or easily repositioned within the enlarged bore portion to accommodate tubular outer diameter.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A centralizer, comprising:
a first extendable end collar including a first stop collar and a first moving collar, wherein the first stop collar is securable to a tubular having a longitudinal axis and axially slidably interlocked for extension with the first moving collar, and wherein the first extendable collar has a range of axial movement between a retracted position and an extended position;
a plurality of bow springs having a first end coupled to the first moving collar; and
a first sleeve having a bore receivable onto a first set of one or more fingers, wherein the first set of one or more fingers extends in a first axial direction along the longitudinal axis of the tubular, away from the first stop collar, wherein the first sleeve being received on the first set of one or more fingers results in an interference-fit to secure the first stop collar to the tubular.

2. The centralizer of claim 1, wherein the first extendable collar includes a plurality of heads secured to one of the first stop collar and the first moving collar, and wherein the plurality of heads are slidably captured within chambers cut into the other of the first stop collar and the first moving collar.

3. The centralizer of claim 2, wherein the plurality of heads at least partially define boundaries of the chambers.

4. The centralizer of claim 2, wherein the plurality of heads, when projected onto a plane, are of a shape selected from generally rectangular, generally arrow-shaped and generally bulbous.

5. The centralizer of claim 2, wherein at least one of the plurality of heads is integral with an axial extension secured to one of the first stop collar and the first moving collar.

6. The centralizer of claim 1, wherein the first set of one or more fingers defines a radially outer surface and a radially inner surface, the radially inner surface and the radially outer surface extending parallel to the tubular.

7. The centralizer of claim 6, wherein the first set of one or more fingers further defines a bevel connecting the radially outer surface and the radially inner surface proximal to an axial end of the first set of one or more fingers such that, when the first sleeve is received onto the first set of one or more fingers, the first sleeve engages and is at least partially expanded by the first set of one or more fingers at the bevel and then slides along the radially outer surface of the first set of one or more fingers.

8. The centralizer of claim 1, wherein the first set of one or more fingers extends a first axial length and the sleeve extends a second axial length, the second axial length being greater than the first axial length.

9. The centralizer of claim 8, wherein the first sleeve forms a bullet nose after being received onto the first set of one or more fingers.

10. The centralizer of claim 1, wherein the first moving collar is locked against rotation relative to the first stop collar.

11. The centralizer of claim 1, wherein the first stop collar comprises a wall defining a gap to provide flexible variance of the bore to fit on the tubular over a range of tubular outer diameters.

12. The centralizer of claim 1, wherein each finger of the first set of one or more fingers comprises a taper along the axial extension thereof.

13. The centralizer of claim 1, wherein, after the first sleeve is received onto the first set of one or more fingers, the first sleeve is configured to resist displacement from the first set of one or more fingers in the first axial direction and in a second axial direction that is opposite to the first axial direction.

14. The centralizer of claim 1, wherein the first stop collar comprises a base defining an enlarged bore portion, the base receiving at least a portion of the first set of one or more fingers between the enlarged bore portion and the tubular.

15. The centralizer of claim 1, wherein a portion of the first sleeve has a first inner diameter prior to being received onto the first set of one or more fingers and a second inner diameter when the first sleeve is received onto the set of one or more fingers, the second inner diameter being larger than the first inner diameter, and wherein, when the sleeve is received onto the first set of one or more fingers, an elasticity of the sleeve causes the sleeve to apply a gripping force to the set of one or more fingers.

16. A centralizer, comprising:
a first extendable end collar including a first stop collar comprising a first projection and a first recess and a first moving collar comprising a second projection and a second recess, wherein the first stop collar is securable to a tubular having a longitudinal axis, and wherein the first projection slidably interfits with the second recess and the second projection slidably interfits with the first recess such that the first extendable collar has a range of axial movement between a retracted position and an extended position;
a second extendable collar including a second stop collar and a second moving collar, wherein the second stop collar is securable to the tubular and axially slidably interlocked for extension with the second moving collar, and wherein the second extendable collar has a range of axial movement between a retracted position and an extended position;
a plurality of bow springs having a first end coupled to the first moving collar and a second end coupled to the second moving collar, wherein the plurality of bow springs is collectively flexible to vary a distance between the first moving collar and the second moving collar;

a first sleeve having a bore receivable onto a first set of one or more fingers extending from the first stop collar and along the longitudinal axis of the tubular to form an interference-fit to secure the first stop collar to the tubular; and a second sleeve having a bore receivable onto a second set of one or more fingers extending from the second stop collar and along the longitudinal axis of the tubular to form an interference-fit to secure the second stop collar to the tubular.

17. The centralizer of claim 16, wherein the first moving collar is locked against rotation relative to the first stop collar.

18. The centralizer of claim 16, wherein at least a portion of the bore of the first sleeve is expanded radially outward when the first sleeve is received onto the first set of one or more fingers, such that an elasticity of the first sleeve applies a radial gripping force on the first set of one or more fingers.

19. The centralizer of claim 16, wherein the first stop collar further comprises a third projection and the first moving collar further comprises a fourth projection, the first and third projections defining the first recess therebetween and the second and fourth projections defining the second recess therebetween.

* * * * *